US012586852B2

(12) United States Patent
George et al.

(10) Patent No.: US 12,586,852 B2
(45) Date of Patent: Mar. 24, 2026

(54) BATTERY CASE

(71) Applicant: ROLLS-ROYCE plc, London (GB)

(72) Inventors: Luke George, Derby (GB); Douglas Campbell, Derby (GB); Robert Martin, Derby (GB); Andrew Limmack, Derby (GB)

(73) Assignee: ROLLS-ROYCE PLC, London (GB)

( * ) Notice: Subject to any disclaimer, the term of this patent is extended or adjusted under 35 U.S.C. 154(b) by 1257 days.

(21) Appl. No.: 17/305,634

(22) Filed: Jul. 12, 2021

(65) Prior Publication Data

US 2022/0021059 A1     Jan. 20, 2022

(30) Foreign Application Priority Data

Jul. 16, 2020   (GB) ..................................... 2010945

(51) Int. Cl.
| | |
|---|---|
| *H01M 50/231* | (2021.01) |
| *H01M 50/227* | (2021.01) |
| *H01M 50/24* | (2021.01) |
| *H01M 50/249* | (2021.01) |

(52) U.S. Cl.
CPC ....... *H01M 50/231* (2021.01); *H01M 50/227* (2021.01); *H01M 50/24* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2,121,791 A | 6/1938 | Crown | |
| 4,204,899 A | 5/1980 | Walker et al. | |
| 2006/0073383 A1 | 4/2006 | Han | |
| 2013/0196121 A1* | 8/2013 | Beumler | ............... B29C 70/885 |
| | | | 428/189 |
| 2015/0221914 A1 | 8/2015 | Page et al. | |
| 2016/0133883 A1 | 5/2016 | Hwang et al. | |
| 2019/0176958 A1* | 6/2019 | Woodworth | ........ B29C 45/0053 |
| 2019/0348725 A1* | 11/2019 | Golubkov | .......... H01M 50/124 |

FOREIGN PATENT DOCUMENTS

| | | | |
|---|---|---|---|
| DE | 102014018752 A1 | 6/2016 | |
| EP | 3327817 A1 | 3/2018 | |
| EP | 3327817 B1 | 3/2018 | |
| WO | 2010/119431 A2 | 10/2010 | |

OTHER PUBLICATIONS

Clark, L.E., & Mclain, A.G. (1965). Performance of Five Ablation Materials as Coatings for Structures in a Region of Separated Flow. Dec. 7, 2021 extended Search Report issued in European Patent Application No. 21182648.2.

* cited by examiner

*Primary Examiner* — Maria Laios
(74) *Attorney, Agent, or Firm* — OLIFF PLC

(57) ABSTRACT

A battery case for housing a battery and a method of fabricating such a battery case are provided. The battery case may be a battery case for an aircraft. The battery case comprises an enclosure having a cavity for housing the battery. An internal surface of the enclosure facing the cavity includes a protective lining comprising cork and a phenolic binder.

20 Claims, 7 Drawing Sheets

BATTERY CASE

CROSS-REFERENCE TO RELATED APPLICATIONS

This application claims priority pursuant to 35 U.S.C. 119(a) to United Kingdom Patent Application No. 2010945.0, filed Jul. 16, 2020, which application is incorporated herein by reference in its entirety.

TECHNICAL FIELD

The present disclosure relates to a battery case having a protective lining, particularly but not exclusively for an aircraft.

BACKGROUND

Future aerospace applications such as more electric, hybrid electric and purely electric aircraft will likely use high voltage battery packs made up of a number of series- and/or parallel-connected battery modules. These battery packs may, for example, be used to power one or more motors used to propel the aircraft and/or to provide power to one or more ancillary systems.

Heating of battery cells beyond their normal operating range can occur for various reasons. For example, a fault may develop in one or more of the modules, or the modules could be exposed to an external source of heat such as a fire, direct sunshine or exhaust gas from a gas turbine engine. Heat from one battery module can spread to others, which could lead to thermal runaway of an entire battery pack. Excessive heating and thermal runaway creates a risk of fire and with it damage to the battery, damage to the surrounding structure of the aircraft and risk of electric shock, for example by causing damage to electrical insulation and structures that support the cells and bus bars.

Clearly it is desirable to protect against the consequences of excessive cell heating. To this end, practical systems, particularly those in the automotive sector, typically use a combination of protective measures. This usually includes a Battery Management System (BMS) which monitors the temperatures of the battery cells and, for example, controls a breaker to isolate modules that are overheating. Other measures include the use of protective materials in the vehicle, for example thermal and flame barrier materials such as stainless steel and titanium; intumescent materials made from mineral fibres; and insulating materials such as Alumino Silicate Wool (ASW).

SUMMARY OF THE DISCLOSURE

The present disclosure provides a battery case with a protective lining that may find particular application in aircraft, particularly but not exclusively more electric, purely electric or hybrid electric aircraft.

According to a first aspect there is provided a battery case for housing a battery. The battery case comprises an enclosure having a cavity for housing the battery. An internal surface of the enclosure facing the cavity includes a protective lining comprising cork and a phenolic binder.

It will be understood that the battery may be any suitable collection of battery cells, for example a battery pack; one or more channels of a multi-channel battery pack; one or more modules of a multi-module battery pack; or any other sub-unit of a battery pack, channel or module.

It will be understood that a phenolic binder is a phenolic resin (also called a phenol formaldehyde resin) used to bind or hold material, in this case cork which may be in a granular form, together.

The protective lining may cover substantially all or only part of the internal surface of the enclosure. The protective lining may be the sole or one of a plurality of layers on the internal surface of the enclosure.

The battery case may comprise one or more internal walls so that the cavity has a plurality of regions separated by the internal walls. One or a plurality of surfaces of at least one of the internal walls may include a protective lining comprising cork and a phenolic binder.

At least a portion of the protective lining may be bonded to a carrier material. The portion of the lining that is bonded the carrier material may be bent or curved to conform to a shape of the, or part of the, enclosure.

The protective lining may include at least a first lining portion covering a first section of the internal surface and comprising cork and a phenolic binder; a second lining portion covering a second section of the internal surface and comprising cork and a phenolic binder; and a joint at an interface between the first and second lining portions.

The joint may comprise a phenolic cork putty and/or a plurality of overlapping layers of the protective lining.

The enclosure may comprise a composite material having a cork core.

The enclosure may have a top internal surface and a bottom internal surface opposite the top internal surface. The bottom internal surface may not be lined with the protective lining or may be lined with a thinner lining than the top internal surface.

According to a second aspect, there is provided a battery assembly, comprising: a battery case according to the first aspect; and a battery within the cavity of the battery case.

The battery may define one or more flame or vent directions in which battery cells of the battery vent flames or other thermal products. The protective lining of the battery case may include at least one joint, each joint joining two or more adjacent lining portions of the protective lining. Each of the at least one joints may be located so as not to coincide with any of the one more flame directions of the battery pack. For cylindrical cells, the flame directions may be parallel to the longitudinal axes of the cylinders.

According to a third aspect, there is provided an aircraft comprising the battery assembly of the second aspect. The aircraft may be configured so that the battery case is a structural component of the aircraft.

According to a fourth aspect, there is provided a method of fabricating a battery assembly. The method comprises: obtaining a battery case assembly which, when assembled, includes an enclosure having a cavity for housing a battery; and applying a protective lining comprising cork and a phenolic binder to a surface of the battery case assembly. When the battery case assembly is assembled, the surface is an internal surface of the enclosure.

Applying the protective lining to the surface may comprise: obtaining a generally flat piece of protective lining comprising cork and a phenolic binder; bending the generally flat piece of the protective lining into a curved piece of protective lining; and applying the curved piece of protective lining to the surface of the battery case assembly.

Prior to bending the generally flat piece of the protective lining, a carrier material may be bonded to the generally flat piece of the protective lining.

Bending the generally flat piece of the protective lining into a curved piece of protective lining may comprise applying one or more cycles of heating and compression to the generally flat piece of the protective lining.

Applying the protective lining to the surface may comprise spraying a cork and phenolic binder mixture onto the surface.

Applying the protective lining to the surface may comprise machining a piece of lining material to conform to a shape of the surface and applying the machined piece to the surface.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

SPECIFIC DESCRIPTION

Figure 1:
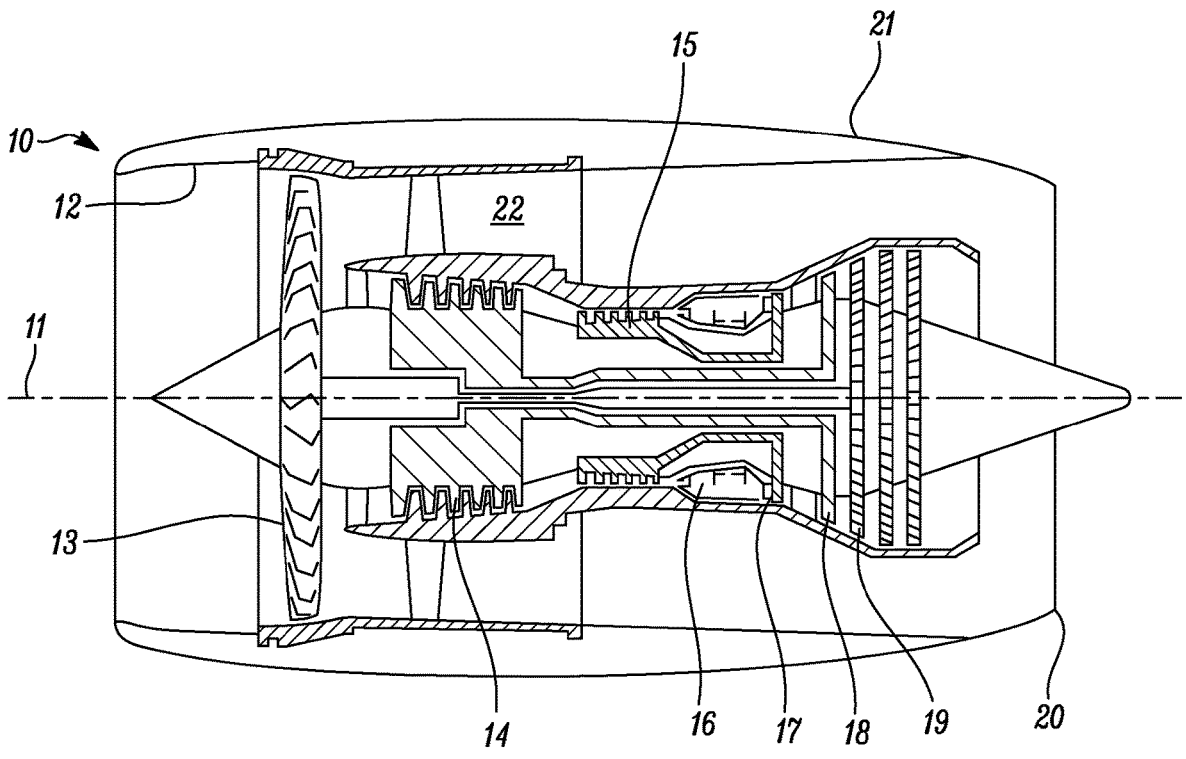
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan. The gas turbine engine may also incorporate or interface with one or more batteries, for example to power ancillary electrical systems and/or to cooperate with one or more electric machines involved in the transfer of mechanical power to and from one or more of the interconnecting shafts.

Figure 2A:
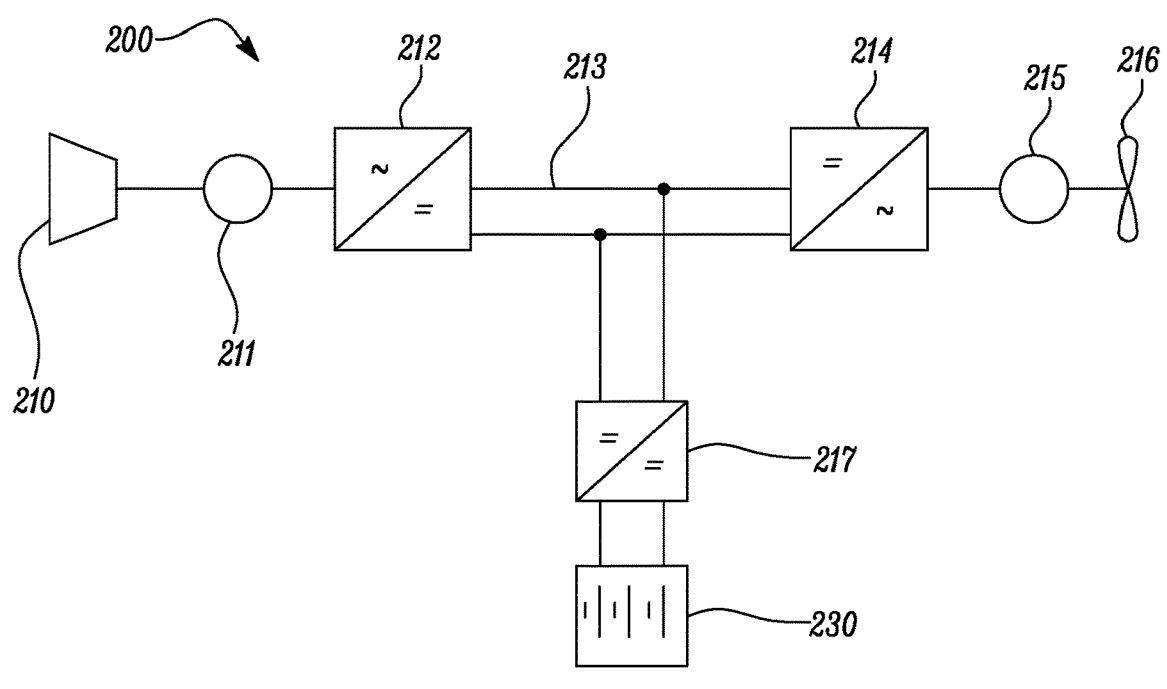
FIG. 2A is a schematic illustration of a hybrid electric aircraft propulsion system.

Now referring to FIG. 2A, the propulsion system of a hybrid electric aircraft is generally indicated at 200 and incorporates both an engine 210, such as the gas turbine engine 10 described above with reference to FIG. 1, and a battery 230. Both the engine 210 and the battery 230 are used as energy sources to power a motor-driven propeller 216, as well as ancillary electrical systems (not shown). The propulsion system 200 of the hybrid electric aircraft will typically further comprise a generator 211, an AC/DC converter 212, a high voltage DC (HVDC) distribution bus 213, a DC/AC converter 214, a motor 215 that drives the propeller 216, and a DC/DC converter 217.

A shaft of the engine 210 is coupled to and drives the rotation of a shaft of the generator 211 which thereby produces alternating current. The AC/DC converter 212, which faces the generator 211, converts the alternating current into direct current which is fed to various electrical systems via the HVDC distribution bus 213. These electrical systems include the motor 215 that drives the propeller 216. The motor 215 will typically be a synchronous motor that interfaces with the HVDC distribution bus 213 via the DC/AC converter 214.

The battery 230, which may be made up of a number of lithium ion battery modules connected in series and/or parallel, is connected to the HVDC distribution bus 213 via the DC/DC converter 217. The DC/DC converter 217 converts between a voltage of the battery 230 and a voltage of the HVDC distribution bus 213. In this way, the battery 230 can replace or supplement the power provided by the engine 210 (by discharging and thereby feeding the HVDC distribution bus 213) or can be charged using the power provided by the engine 210 (by being fed by the HVDC distribution bus 213).

Figure 2B:
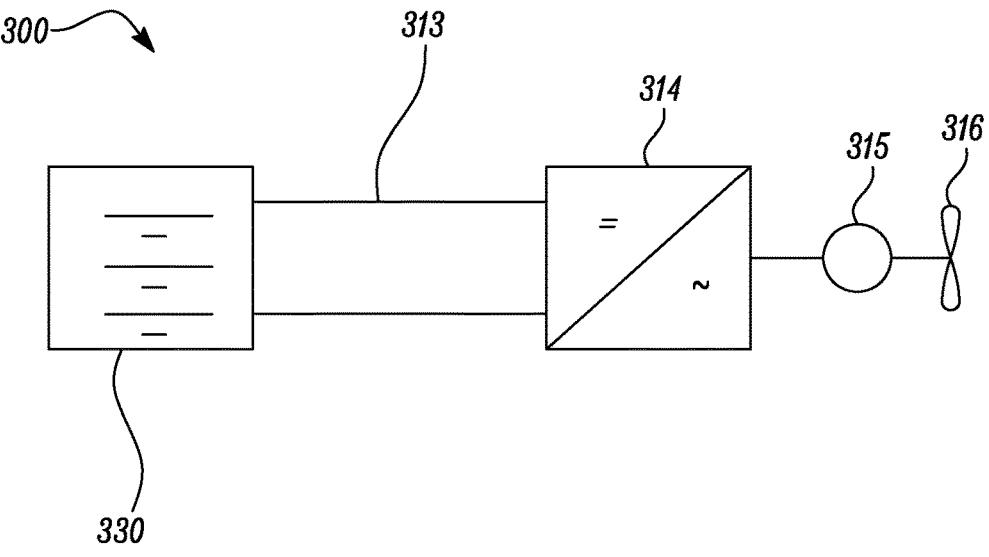
FIG. 2B is a schematic illustration of a purely electric aircraft propulsion system.

A battery will also appear in the propulsion system of a purely electric aircraft, generally indicated as 300 in FIG. 2B. The battery 330 feeds a HVDC distribution bus 313, possibly via DC/DC converter (not shown), which delivers power to one or more synchronous motors 315 via a DC/AC converter 314. The one or more motors 315 drive the one or more propellers 316 that propel that aircraft.

Batteries used in these applications may have high terminal voltages, for example 500V to 3 kV. The use of high voltages advantageously allows for a reduction in the weight of the power distribution cabling, but it does create risk factors. For example, a fault within one or more of the battery modules could lead to thermal runaway, creating a risk of fire and electric shock. Further, during a thermal event, cells may vent thermal products including flames, gas jets, projectiles and heat. A battery case may be used to help contain the risk of thermal events in the battery pack, but the case itself is not immune to damage.

Figure 3:
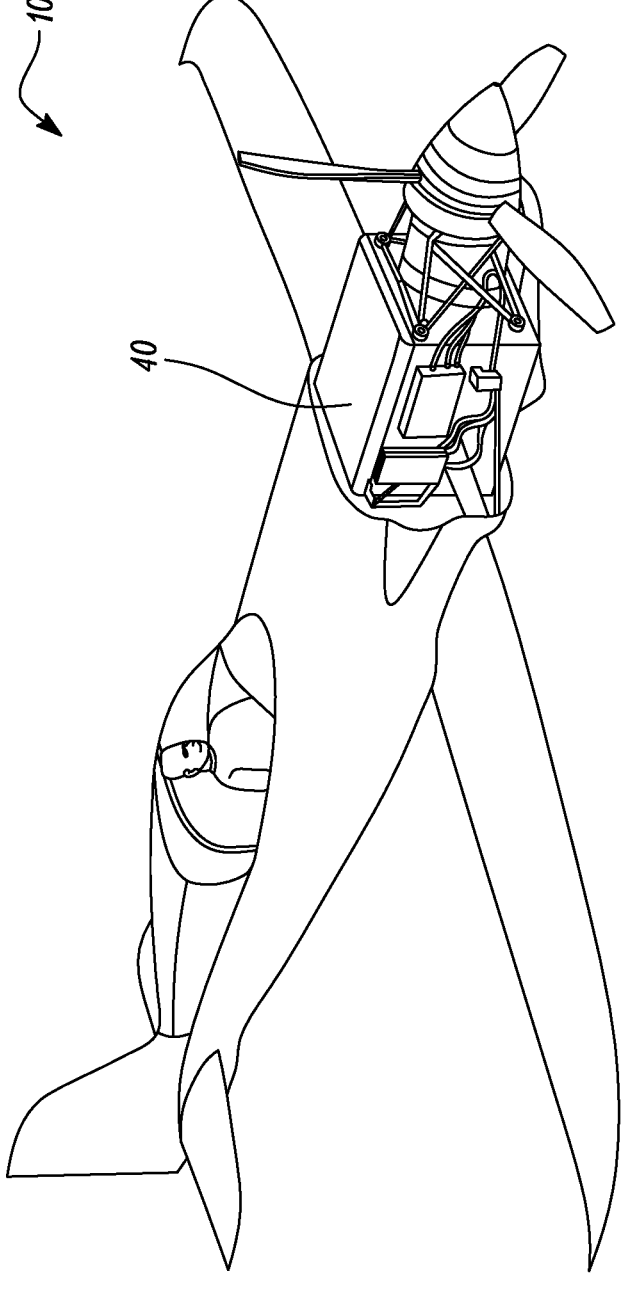
FIG. 3 is a perspective view of an aircraft incorporating a battery case as a structural component.

These risks may be particularly acute where the battery case is a structural member of the airframe. By way of an example, FIG. 3 shows a purely electric aircraft 100 that includes a high-voltage battery housed within a battery case 40. It can be seen that the battery case 40 is structurally connected to the airframe of the aircraft 100 such that mechanical loads will be transmitted through the battery case 40. Damage to a structural battery case 40, for example fire damage following thermal runaway in the battery, could have particularly severe consequences as it could damage the structural integrity of the airframe.

In accordance with the present disclosure, a battery case is provided with a protective internal lining formed of ablative cork and a phenolic binder. It has been found that a lining of cork with a phenolic binder provides a battery case with surprisingly enhanced thermal and mechanical protection, without adding significant mass to the battery case.

Figure 4A:
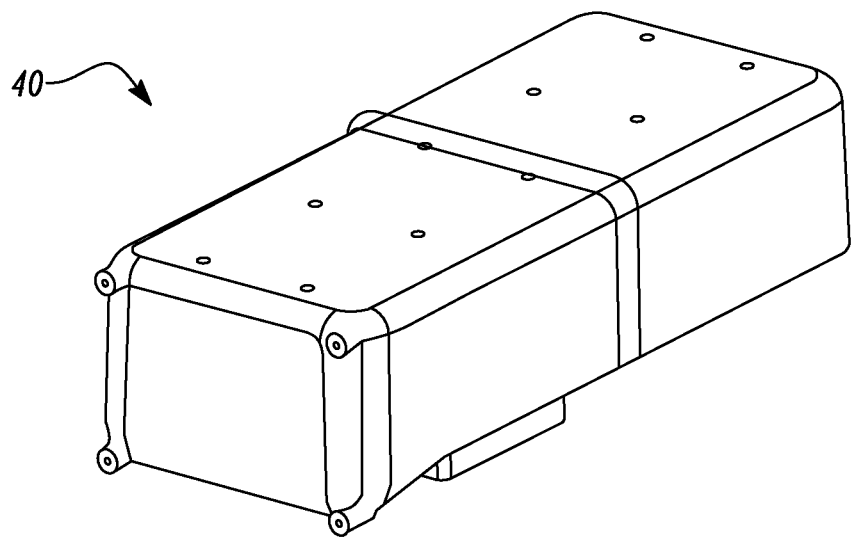
FIG. 4A is a perspective view of a battery case.
Figure 4B:
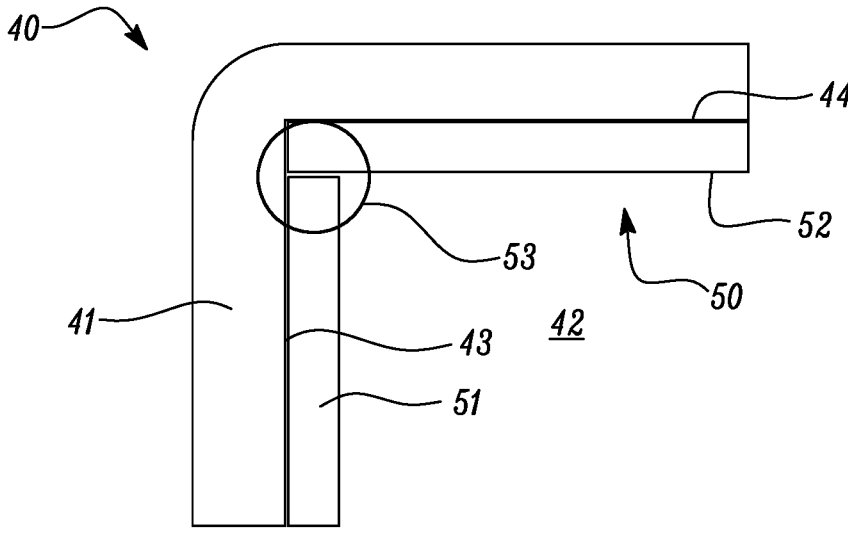
FIG. 4B is a cross-sectional view of a portion of a battery case with a protective lining.
Figure 5:
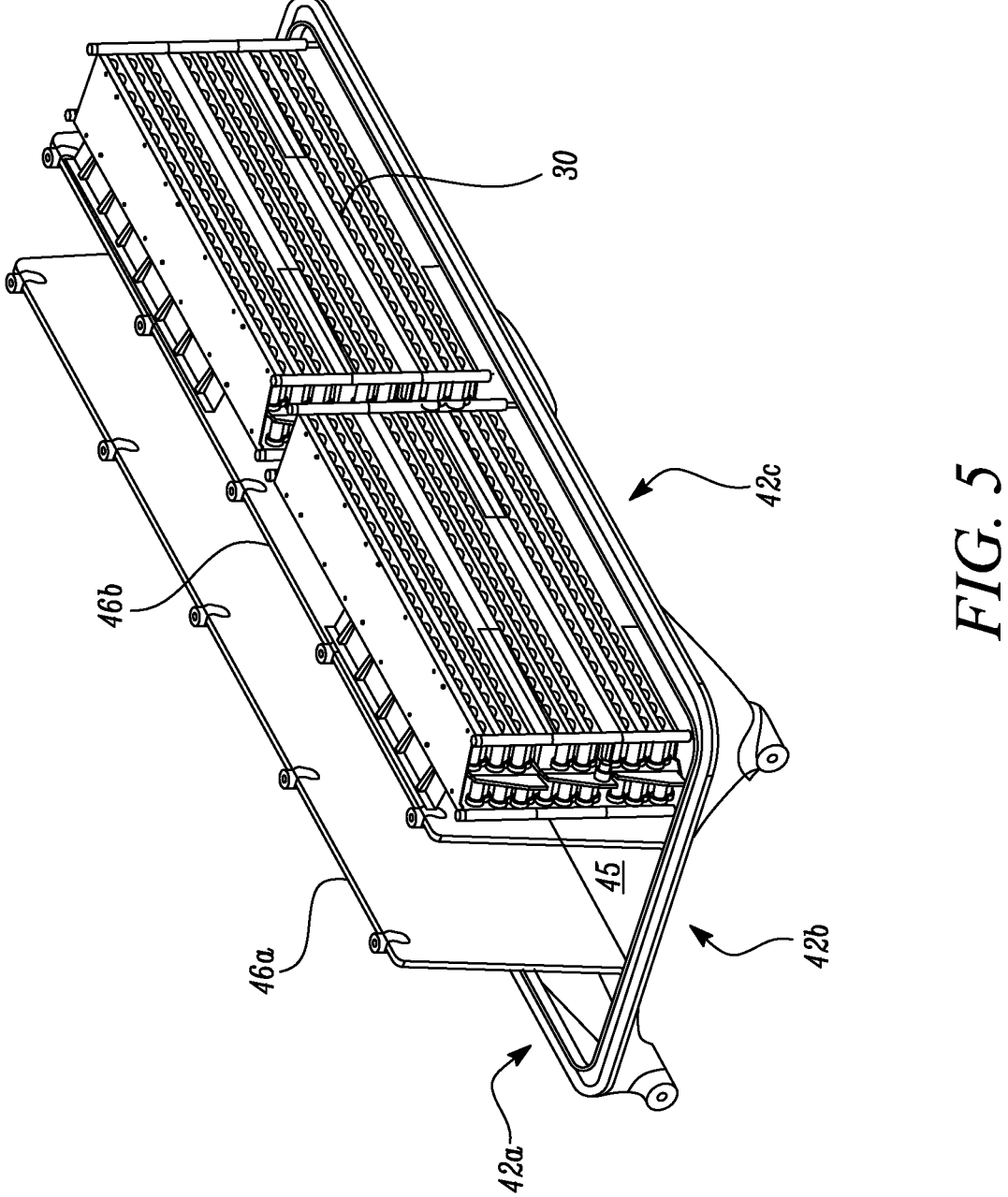
FIG. 5 is a perspective view of a battery case illustrating internal walls.
Figure 6A:
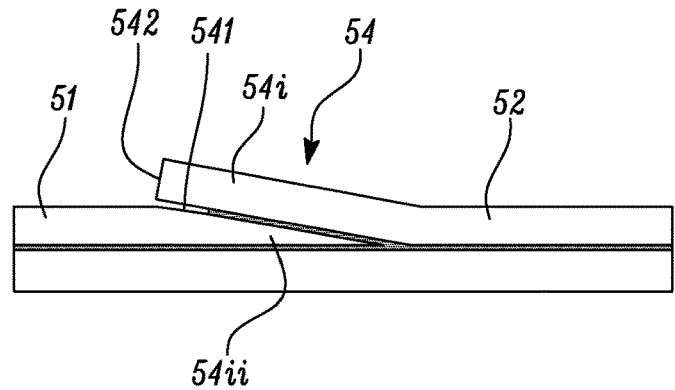
FIG. 6A is a cross-sectional view illustrating a joint in a protective lining.
Figure 6B:
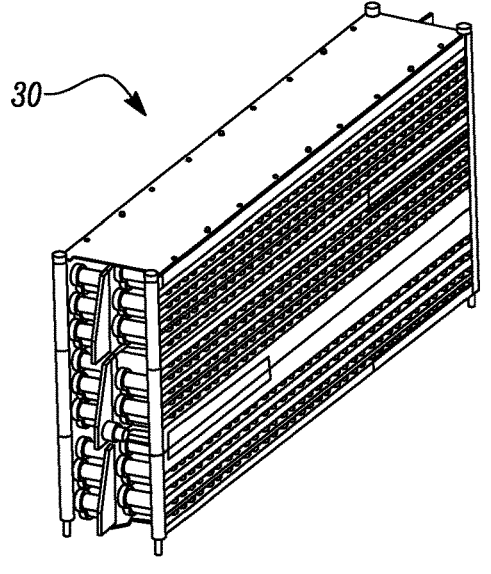
FIG. 6B is a perspective view of a battery.

FIGS. 4A and 4B show a battery case 40 which, in use, houses a high-voltage battery 30, parts of which are visible in FIGS. 5 and 6B.

The battery case 40 includes an enclosure or housing 41 that defines an internal cavity 42 for containing the battery 30. The enclosure 41 may be of any suitable construction given the application requirements, for example given the size and shape of the battery 30 to be used. The enclosure 41 may also formed of any suitable material or materials. In some examples, the enclosure 41 comprises or is formed of a composite material, and this may particularly desirable where the battery case 40 is to be a structural component of a vehicle, for example an aircraft.

As can be seen in FIG. 4B, an internal surface 43, 44 of the enclosure 41 facing the cavity 42 is provided with a protective lining 50. The protective lining 50 is formed of a cork material combined with a phenolic binder.

The internal lining 50 protects the battery case 40 (for example the composite material of the case) against flame, gas jet, projectiles and heat rejected from batteries during any thermal runaway event that may occur during use, and also provides additional electrical insulation. It has been found that a lining comprising cork and phenolic binder is particularly effective in preventing the case 40 (for example the composite and associated resin system of the case 40) from exceeding its glass transition temperature ($T_g$), beyond which its mechanical properties would significantly change. This may be achieved through several mechanisms, for example:

As an ablative material, with the cork material protecting the case 40 through loss of mass. This mechanical removal and pyrolysis of gas takes energy from the system, while also possibly exposing fresh, cooler material behind.

The cork material may provide a low density insulator through its natural microstructure, which may be made up of pentagonal or hexagonal prisms containing an air-like gas.

When exposed to a flame source, the lining material chars, forming a stronger surface layer, which also acts to seal the surface and help to snub out fire, reducing the risk of the material igniting.

The combined cork and phenolic binder lining 50 may be formed in a number of different ways, including but not limited to mixing ground cork with a phenolic resin. The mixture may then be applied to the surface, for example by spraying the mixture through a nozzle. In another example, the mixture may be set it in the form of a sheet. The sheet of lining material can then be applied and bonded to the internal surface 43 using a suitable heat-resistant bonding agent.

Suitable bonding agents include but are not limited to heat-resistant silicone and resin films. In one particular example a phenolic resin film is used, and this may improve the heat and fire-resistance of the lining 50 and also reduce reactions between the lining 50 and bonding agent during curing. In some examples, described in more detail below, portions of the lining 50 may first be bonded to a carrier material (e.g., Kevlar (Registered Trade Mark) or another synthetic fibre) and the combined carrier and lining 50 bonded to the internal surface 43 of the enclosure 40.

The thickness of the protective lining 50 may vary according to application requirements, with greater thicknesses providing additional protection against fire and thermal products but also additional mass. The thickness may typically be about 2-4 mm, and in one specific example is about 3 mm, though greater, lesser and non-uniform thicknesses could be used.

Now referring to FIG. 4B and FIG. 5, the enclosure 41 includes a top internal surface 44 and a bottom internal surface 45 opposite the top internal surface 44. It will be understood that the designations "top" surface and "bottom" surface are used with reference to the orientation of the battery case 40 when oriented as intended for normal use. Normal use may, for instance, be the level flight of an aircraft in which the battery case 40 is to be located. In some examples, the bottom internal surface 45 is not lined with the thermally protective lining 50 or is lined with a thinner lining than the top internal surface 44. This may reduce the cost, mass and complexity of the battery case 50 without negatively affecting its performance, since flames vented by the cells of the battery pack will generally rise and not strike the bottom internal surface 45.

Referring to FIG. 5, the battery case 40 may also include one or more internal walls or barriers 46a, 46b that divide the cavity 42 into two or more regions 42a, 42b, 42c. In this example, the battery 30 comprises three independent battery channels and each one of the three regions 42a, 42b, 42c houses one of the battery channels. The internal walls 46a, 46b help electrically and thermally insulate the regions 42a, 42b, 42c from each other, and one or both sides of one or more of the internal walls 46a, 46b may conveniently be lined with the protective lining 50 of cork and phenolic binder. The thickness of the protective lining 50 on the internal walls 46a, 46b may be the same as or similar to the thickness of the protective lining on the internal surface of the enclosure 41.

Now referring to FIG. 4B and FIG. 6A, it can be seen that the protective lining 50 may include one or more joints 53, 54 where two adjacent portions 51, 52 of the lining 50 meet. The provision of joints 53, 54 may be necessary because of the geometry of enclosure 41, for example where the enclosure 41 has corners or curves which cannot be satisfactorily covered by a single, typically flat, portion of the lining 50. This is illustrated in FIG. 4B where a joint 53 is present in a corner of the enclosure 41. In other examples, joints 53, 54 may be utilized due to size constraints, for example where a single sheet of protective lining 50 of a size sufficient to cover an entire section of the enclosure 40 is unavailable. This is illustrated in FIG. 6A, where a joint 54 is provided at the interface between two portions 51, 52 of the lining which cover a substantially planar section of the internal surface enclosure 41.

Joints 53, 54 between adjacent lining portions 51, 52 may be formed in a variety of different ways, and may be adapted to reduce the extent to which the joints are points of thermal and mechanical weakness. Examples include, but are not limited to:

Adjacent portions 51, 52 of the protective lining 50 may be positioned close together and the joint 53, 54 filled with a heat-resistant material. Examples of heat-resistant materials include high temperatures silicone, resins such as FST (Fire, Smoke and Toxicity) rated resins and phenolic resins, and/or phenolic cork putty. A phenolic cork putty may be formed by mixing ground cork with a phenolic resin to form a paste, which can be used to seal the joint 53, 54 prior to curing.

A joint 53, 54 may comprise multiple overlapping layers of the protective lining 50. In FIG. 6A, this is achieved by shaping (e.g., tapering) and/or bending the terminating ends of the adjacent portions 51, 52 of the lining 50 so that they form a region 54 having two overlapping layers 54i, 54ii. Any space between the overlapping layers 54i, 54ii may be filled with a sealing material, for example a heat-resistant resin or phenolic cork putty.

Multiple layers may be provided in other ways, for example bonding or taping one or more separate, additional sections of lining material 50 over the joint region.

Filling and/or bonding material used to fill the joint 53, 54 may be applied so as to stop short of an exposed edge of the joint. This is illustrated in FIG. 6A, where a region 541 of the joint 54 adjacent an exposed edge 542 is left free of filling material so as to reduce the risk its exposure to the heat and flame.

Exposed edges of a joint, such as the edge 542 in FIG. 6A, may be treated with an additional flame retardant coating.

While one or more joints 53, 54 may be necessary to satisfactorily cover the internal surface 43 of the enclosure 41, the need for joints may be reduced by bending or otherwise curving sections of protective lining 50 such that the lining 50 can conform to a non-planar region of the enclosure 40. Generally speaking, a lining 50 of cork and a phenolic binder has a relatively large minimum bend radius. However the minimum bend radius may be somewhat reduced by first bonding a substantially flat portion of the lining material 50 to a carrier material, for example a relatively strong and flexible carrier material such as Kevlar (Registered Trade Mark). Additionally or alternatively, the lining material 50 may be subject to a combined heat and compression cycle, for example around a jig, prior to its application so that the lining 50 can more flexibly applied to the internal surface 41 of the enclosure 40.

FIG. 6B shows part of a high-voltage battery 30 such as may be used in an electric aircraft or hybrid electric aircraft. In this example the battery 30 includes a large number of series and parallel connected lithium-ion battery cells, in particular 4.2V 18650 cylindrical cells, held within a carrier frame.

During a thermal event, cells may vent thermal products including flames, gas jets, projectiles and heat. This release is typically directional. For instance, cylindrical cells will typically vent in a direction parallel to the axis of the cylinder and from one on the flat ends of the cylinder.

The battery 30 may be designed and constructed so as to reduce the impact of the release of the thermal products. For instance, as can be seen in FIG. 6B, the cell venting directions may be oriented away from the core of the battery. In other words, the cells should vent outward away from battery. This will discourage the spread of thermal events through the battery and instead direct the thermal products towards the internal lining 50 which is adapted to protect the battery case 40.

Furthermore, the battery case 40 may be designed such that any joints 53, 54 in the internal lining are located so as not to coincide with any of the cell venting directions. The joints 53, 54 may be relatively thermally and mechanically weak compared to the rest of the lining 50. Thus, by locating all of the joints 53, 54 away from venting directions, the risk of compromising the lining 50 and thus the battery case 40 are reduced. The precise locations to be avoided will depend on the type of cells used and the design of the battery 30, but can be readily defined for a given battery 30.

Figure 7A:
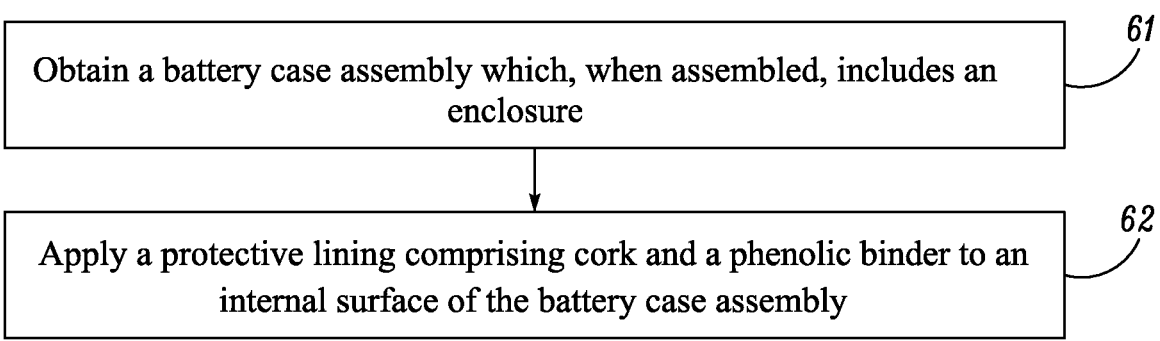
FIG. 7A is a flow chart illustrating a method of fabricating a battery case.

Now turning to FIG. 7A, this illustrates a method of fabricating a battery case 40 with a protective lining in accordance with the present disclosure.

At 61, a battery case assembly which, when assembled, includes an enclosure 41 having a cavity 42 for housing a battery is obtained. The assembly can, for example, include one or more integrally formed walls such as those shown in FIG. 6 which, when assembled together, form a complete battery case 40 such as the one shown in FIG. 4A. The assembly and its parts can be of any suitable construction and of any suitable material, as discussed above.

At 62, a thermally protective lining 50 comprising cork and a phenolic binder is applied to a surface of the battery case assembly. The surface to which the lining 50 is applied is a surface which, when the assembly is assembled, is an internal surface 43 of the enclosure 41 that faces the cavity 42. The protective lining 50 may be pre-prepared and then applied to the surface using a bonding agent, as discussed above. In some cases the protective lining may be cut or machined to shape prior to its application, or may be sprayed onto the surface.

Portions of lining 50 may be applied to multiple surfaces of the battery case assembly, for example to all internal surfaces of the enclosure 41. Where adjacent portions of lining meet, joints 53, 54 may be provided as described above with reference to FIGS. 4B and 6A. The joints 53, 54 may be provided only at locations that do not coincide with one or more predetermined flame directions of the battery 30 that is to be housed within the enclosure 41.

After applying the lining 50 to all of the desired surfaces of the assembly, the parts of the battery case assembly may be assembled together to form the battery case 40. Optionally, prior to or after assembly of the case, the case 40 or its parts may be subject to one or more additional processing steps such as curing.

Figure 7B:
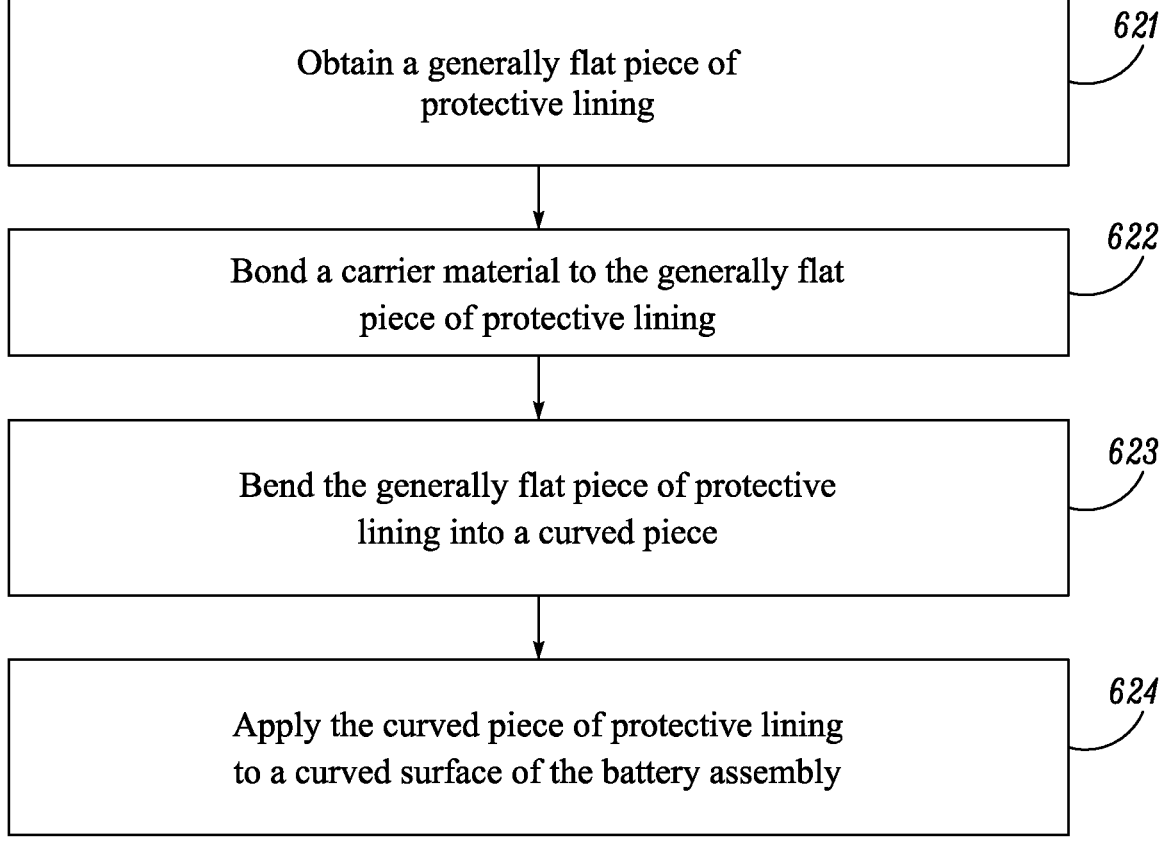
FIG. 7B is a flow chart illustrating further optional details of the method of FIG. 7A.

FIG. 7B is a flow chart illustrating how a portion of the lining 50 may be applied to a curved surface of the battery case assembly.

At 621, a generally flat piece of protective lining is obtained. The protective lining comprises cork and a phenolic binder, as discussed above. It may, for example, be a relatively thin sheet of the material formed by setting a mixture of cork granules and phenolic resin.

Optionally, at 622, the generally flat piece of protective lining is bonded to a carrier material. The carrier material may be a relatively flexible, strong and lightweight material, for example Kevlar (Registered Trade Mark) or another synthetic fibre material. It may be bonded in any suitable way, for example using a phenolic resin or another bonding agent. The use of a carrier material may increase the strength of the lining, decreasing the bend radius below which the lining may fracture.

At 623, the generally flat piece of protective lining is bent into a curved piece of lining that will conform to a predefined curved shape of a surface of the battery case assembly. Bending the generally flat piece of protective lining may, for example, include placing the lining over a jig and subjecting the lining to cycles of combined heat and compression until a desired degree of bend or curvature is achieved.

At 624, the curved piece of protective lining is applied to a correspondingly curved surface of the battery case assembly. As discussed above, the lining may be applied using a bonding agent. Where the protective lining was bonded to a carrier material, the carrier may be removed prior to applying the lining to the surface or may be retained as part of the lining.

Various modifications may be made to the battery case 40 and methods described above. For example:

An external surface of the enclosure 41 may also be provided with a protective lining of cork and phenolic binder.

Another aircraft component may be provided with a protective lining of cork and phenolic binder to protect the component against battery fire.

The enclosure 41 may be made of a composite material having a cork core.

One or more additional layers, in addition to the cork and phenolic binder layer, may be provided on the internal surface 43 of the enclosure 41.

Rather than applying a sheet of the protective material, suitably sized and shaped pieces may be machined and applied. This may allow for the coverage of more complex geometries.

Rather than applying a sheet or machined piece of protective lining, a mixture of cork and binder may be applied to a surface of the battery case by spraying. As the viscosity of the mixture will typically be quite high, the use of a relatively large spray nozzle (of the order of ten to hundreds of millimetres in diameter) and a propellant may be preferable. The viscosity of the mixture can be varied by changing the ratio of the cork granules and resin, and/or by changing the size of the cork granules.

Alternative, non-phenolic, binders may be used. Entirely different, non-cork based, protective linings may be used in combination with the principles described herein, for example the use of joints that do not coincide with cell venting directions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A battery case for housing a battery assembly, comprising:

an enclosure having a cavity for housing the battery assembly, wherein an internal surface of the enclosure facing the cavity includes a protective lining comprising cork and a phenolic binder, the protective lining directly contacting the cavity of the enclosure.

2. The battery case of claim 1, comprising one or more internal walls so that the cavity has a plurality of regions separated by the internal walls, at least one of the internal walls including a protective lining comprising cork and a phenolic binder.

3. The battery case of claim 1, wherein at least a portion of the protective lining is bonded to a carrier material.

4. The battery case of claim 3, wherein the portion of the lining that is bonded the carrier material is bent or curved to conform to a shape of at least a portion of the enclosure.

5. The battery case of claim 1, wherein the protective lining includes at least a first lining portion covering a first section of the internal surface and comprising cork and a phenolic binder; a second lining portion covering a second section of the internal surface and comprising cork and a phenolic binder; and a joint at an interface between the first and second lining portions.

6. The battery case of claim 5, wherein the joint comprises a phenolic cork putty.

7. The battery case of claim 5, wherein the joint comprises a plurality of overlapping layers of the protective lining.

8. The battery case of claim 1, wherein the enclosure comprises a composite material having a cork core, the cork core being a series of a number of cork particles.

9. The battery case of claim 1, wherein the enclosure has a top internal surface and a bottom internal surface opposite the top internal surface, and wherein the bottom internal surface is not lined with the thermally protective lining or is lined with a thinner lining than the top internal surface.

10. The battery case of claim 1, wherein an external surface of the enclosure is also lined with a thermally protective lining comprising cork and a phenolic binder.

11. A battery assembly, comprising:

a battery case as claimed in claim 1; and a battery within the cavity of the battery case.

12. The assembly of claim 11, wherein:

the battery defines one or more flame directions in which battery cells of battery vent flames;

the protective lining of the battery case includes at least one joint, each joint provided at an interface between two or more adjacent lining portions of the protective lining; and each of the at least one joints is located so as not to coincide with any of the one or more flame directions of the battery pack.

13. An aircraft comprising a battery assembly as claimed in claim 11.

14. The aircraft of claim 13, configured so that the battery case is a structural component of the aircraft.

15. A method of fabricating a battery case having a protective lining, the method comprising:

obtaining a battery case assembly which, when assembled, includes an enclosure having a cavity for housing a battery; and applying a protective lining comprising cork and a phenolic binder to a surface of the battery case assembly, wherein, when the battery case assembly is assembled, the surface is an internal surface of the enclosure.

16. The method of claim 15, wherein applying the protective lining to the surface comprises:

obtaining a generally flat piece of protective lining comprising cork and a phenolic binder;

bending the generally flat piece of the protective lining into a curved piece of protective lining; and applying the curved piece of protective lining to the surface of the battery case assembly.

17. The method of claim 16, further comprising, prior to bending the generally flat piece of the protective lining, bonding a carrier material to the generally flat piece of the protective lining.

18. The method of claim 16, wherein bending the generally flat piece of the protective lining into a curved piece of protective lining comprises applying one or more cycles of heating and compression to the generally flat piece of the protective lining.

19. The method of claim 15, wherein applying the protective lining to the surface comprises spraying a cork and phenolic binder mixture onto the surface.

20. The method of claim 15, wherein applying the protective lining to the surface comprises machining a piece of lining material to conform to a shape of the surface and applying the machined piece to the surface.

* * * * *